(12) United States Patent
Konishi et al.

(10) Patent No.: US 8,568,596 B2
(45) Date of Patent: *Oct. 29, 2013

(54) MEMBRANE FILTERING DEVICE MANAGING SYSTEM AND MEMBRANE FILTERING DEVICE FOR USE THEREIN, AND MEMBRANE FILTERING DEVICE MANAGING METHOD

(75) Inventors: Takahisa Konishi, Ibaraki (JP); Norio Ikeyama, Ibaraki (JP); Kouji Maruyama, Ibaraki (JP); Yukio Fujiwara, Ibaraki (JP); Akira Ootani, Ibaraki (JP); Toshiki Kouno, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 253 days.

This patent is subject to a terminal disclaimer.

(21) Appl. No.: 12/996,096

(22) PCT Filed: Jun. 2, 2009

(86) PCT No.: PCT/JP2009/060016
§ 371 (c)(1),
(2), (4) Date: Dec. 3, 2010

(87) PCT Pub. No.: WO2009/148031
PCT Pub. Date: Dec. 10, 2009

(65) Prior Publication Data
US 2011/0079546 A1    Apr. 7, 2011

(30) Foreign Application Priority Data

Jun. 6, 2008  (JP) ................ 2008-149627
Jun. 6, 2008  (JP) ................ 2008-149638

(51) Int. Cl.
*B01D 63/12* (2006.01)
*B01D 65/00* (2006.01)

(52) U.S. Cl.
USPC ........... 210/650; 73/866.5; 210/87; 210/90; 210/96.2; 210/321.72; 210/321.74; 210/321.76; 210/739; 210/741

(58) Field of Classification Search
USPC ............. 210/85, 87, 90, 91, 93, 96.2, 103, 210/321.6, 321.72, 321.74, 321.76, 641, 210/650, 652, 739–746; 73/38, 40, 866, 5, 73/865.8, 865.9; 340/539, 603, 606, 611, 340/618; 702/33, 36, 45, 47, 50; 700/266, 700/273
See application file for complete search history.

(56) References Cited

U.S. PATENT DOCUMENTS

| 6,609,070 | B1 * | 8/2003 | Lueck ............... 702/50 |
| 6,936,160 | B2 * | 8/2005 | Moscaritolo et al. ........... 210/85 |
| 7,584,061 | B2 * | 9/2009 | Wilf et al. ........... 702/35 |
| 7,591,950 | B2 * | 9/2009 | Zha et al. ............. 210/650 |
| 7,736,495 | B2 * | 6/2010 | Ikeyama et al. ............. 210/85 |
| 7,824,543 | B2 * | 11/2010 | Larkner ................ 210/87 |
| 2004/0020858 | A1 | 2/2004 | Ventresque et al. |
| 2005/0109681 | A1 * | 5/2005 | Moscaritolo .......... 210/85 |
| 2005/0194317 | A1 | 9/2005 | Ikeyama et al. |
| 2007/0240492 | A1 * | 10/2007 | DiLeo et al. ............ 73/38 |
| 2008/0105038 | A1 * | 5/2008 | Jons et al. ............ 73/38 |
| 2009/0320563 | A1 * | 12/2009 | Wilf et al. ............ 73/38 |
| 2011/0114560 | A1 * | 5/2011 | Konishi et al. ............ 210/650 |
| 2011/0114561 | A1 * | 5/2011 | Konishi et al. ............ 210/650 |

FOREIGN PATENT DOCUMENTS

| CN | 1431925 | 7/2003 |
| CN | 1993171 | 7/2007 |
| JP | 6-114239 | 4/1994 |
| JP | 2000-015064 | 1/2000 |
| JP | 2001-129365 | 5/2001 |
| JP | 2001-239134 | 9/2001 |
| JP | 2003-299937 | 10/2003 |
| JP | 2005-351707 | 12/2005 |
| JP | 2007-021440 | 2/2007 |
| JP | 2007-527318 | 9/2007 |
| JP | 2008-080254 | 4/2008 |
| WO | WO 2006/026011 | 3/2006 |
| WO | WO 2007/030647 A2 | 3/2007 |

OTHER PUBLICATIONS

International Search Report issued in the corresponding PCT Application No. PCT/JP2009/060016, dated Jul. 7, 2009.
Adham et al., 1998, Monitoring the integrity of reverse osmosis membranes, Desalination, 119:143-150.
Extended European Search Report dated Jul. 5, 2012, issued in corresponding European patent application No. 09758298.5.
First Office Action dated Nov. 5, 2012 in corresponding Chinese patent application No. 200980120533.0.
Official Communication dated Mar. 5, 2013 in corresponding European patent application No. 09758298.5.

* cited by examiner

*Primary Examiner* — Joseph Drodge

(74) *Attorney, Agent, or Firm* — Knobbe, Martens, Olson & Bear, LLP

(57) ABSTRACT

Provided are a membrane filtering device managing system by which the membrane filtering device can be managed with a better precision and membrane filtering device for use therein, as well as to a membrane filtering device managing method. At least two sensors of an electric conductivity sensor 11, a flow rate sensor 13, and a pressure sensor 15 are provided in at least two membrane elements 10 provided in a membrane filtering device 50. A managing device 200 obtains data from the at least two sensor, and compares the data with comparison data that represents a correlative relationship between a position along the axial line direction in the membrane filtering device 50 and a standard value obtained from the at least two sensor. Accordingly, it is possible to specify the cause of change occurring in the membrane filtering device 50 more definitely, and to carried out a suitable maintenance in accordance with the cause, so that the membrane filtering device 50 can be managed with a higher precision.

16 Claims, 7 Drawing Sheets

MEMBRANE FILTERING DEVICE MANAGING SYSTEM AND MEMBRANE FILTERING DEVICE FOR USE THEREIN, AND MEMBRANE FILTERING DEVICE MANAGING METHOD

This application is the U.S. National Phase under 35 U.S.C. §371 of International
Application No. PCT/JP2009/060016, filed Jun. 2, 2009, which claims priority to the Japanese Patent Applications No. 2008-149627, filed Jun. 6, 2008, and No. 2008-149638, filed Jun. 6, 2008. The International Application was not published in English under PCT Article 21(2).

TECHNICAL FIELD

The present invention relates to a membrane filtering device managing system for managing a membrane filtering device that is formed by disposing and arranging a plurality of membrane elements along an axial line direction within a tubular pressure-resistant vessel and generates a permeated liquid by filtering a raw liquid with the above membrane elements and membrane filtering device for use therein, as well as to a membrane filtering device managing method.

BACKGROUND ART

A membrane filtering device is known which is constructed in such a manner that a plurality of membrane elements are disposed on a straight line, and the above core tubes of adjacent membrane elements are connected with an interconnector (connecting section). The plurality of membrane elements that are connected in this manner are housed, for example, in a pressure-resistant vessel formed of resin, and are treated as one membrane filtering device (for example, refer to Patent Document 1).

A membrane filtering device of this kind is generally used for obtaining purified permeated water (permeated liquid) by filtering raw water (raw liquid) such as waste water or sea water. Particularly in a large-scale plant or the like, numerous membrane filtering devices are held by a rack referred to as a train, whereby management of processing characteristics (pressure, water quality and water amount of the permeated water, and the like) is carried out train by train.

However, when the management of processing characteristics is carried out train by train as described above, it is difficult to specify the location of an inconvenience when the inconvenience occurs in the membrane element or the connecting section of only a part of the membrane filtering devices among the numerous membrane filtering devices that are held by a train, thereby raising a problem in that a lot of labor will be required in the specifying work.

Also, with the construction in which the numerous membrane filtering devices equipped with the plurality of membrane elements are held by the train as described above, the fouling degree of a separation membrane and the load imposed when the raw liquid is filtered by the separation membrane will differ depending on the position of each membrane filtering device in the train or the position of each membrane element within each membrane filtering device. Therefore, in replacing the membrane elements, optimization of the arrangement and combination of the membrane elements is carried out so that an optimum processing performance can be eventually exhibited in the whole train, by housing new membrane elements and still usable membrane elements in a suitable combination within the pressure-resistant vessel. However, in the current situation, the optimization is carried out only based on the term of use, so that it is not possible to say that a sufficient optimization is carried out.

Further, the determination of whether a maintenance such as cleaning or replacing of the membrane elements is to be carried out or not is made based on the processing characteristics for each train, so that there is a case in which the maintenance is not necessarily carried out suitably according to the position or the term of use depending on the membrane elements. In other words, depending on the cases, there is a case in which some membrane elements are in a state where it is too late to perform the maintenance or a case in which the maintenance is carried out at a stage earlier than needed.

In order to cope with the aforementioned problems, the following can be made by using a technique such as disclosed in Patent Document 1 described above. Specifically, for each membrane element, the data related to the aforesaid processing characteristics are stored in advance in a wireless tag (RFID tag) disposed in the membrane element, and the data are read out from each wireless tag, whereby management of the processing characteristics can be carried out for each membrane element. However, even in a case in which the management is carried out based on only the data stored in advance in such a wireless tag, the state of each membrane element sometimes changes time by time, so that it is not possible to say that the precision of management is sufficient. Thus, when the state of each membrane element can be detected in real time, the management can be carried out with a better precision.

Therefore, a method is known in which the state of each membrane element is detected in real time with use of a sensor or the like (for example, refer to Patent Document 2). Patent Document 2 discloses that a flow rate sensor, an electric conductivity sensor, or the like is provided in a plurality of membrane elements.

PRIOR ART DOCUMENTS

Patent Documents

Patent Document 1: Japanese Unexamined Patent Publication No. 2007-527318
Patent Document 2: International Publication No. 2007/030647

DISCLOSURE OF THE INVENTION

Problems to be Solved by the Invention

The method determines the presence or absence of the need for replacement by detecting the state of each membrane element by using a sensor or the like. Therefore, though a change in the state of each membrane element can be confirmed, it is difficult to specify also the causes of the change. For example, even in a case in which a change in the property of the liquid such as permeated water or raw water occurs in any one of the membrane elements, there are a case in which the cause thereof is due to biofouling that is generated by adhesion of a proliferated microorganism to the membrane and a case in which the cause thereof is due to a scale that is generated by adhesion of salts deposited by concentration of the liquid to the membrane.

Therefore, even if the change in the state in each membrane element can be confirmed, the method of maintenance that should be carried out in accordance with the cause of the change differs, so that the maintenance cannot be carried out well unless the cause is specified. Also, when the cause is erroneously specified, not only a good effect may not be obtained even if the maintenance is carried out but also, conversely, a problem of decreasing the lifetime of each membrane element may be raised.

The present invention has been made in view of the aforementioned circumstances, and an object thereof is to provide a membrane filtering device managing system by which the membrane filtering device can be managed with a better precision and membrane filtering device for use therein, as well as to a membrane filtering device managing method.

Means for Solving the Problems

A membrane filtering device managing system according to the present invention relates to a membrane filtering device managing system comprising:

a membrane filtering device that is formed by disposing and arranging a plurality of membrane elements along an axial line direction within a tubular pressure-resistant vessel and generates a permeated liquid by filtering a raw liquid with the membrane elements; and a managing device for managing the membrane filtering device, wherein at least one sensor of an electric conductivity sensor for measuring an electric conductivity of the permeated liquid, a flow rate sensor for measuring a flow rate of the permeated liquid, and a pressure sensor for measuring a pressure of the raw liquid is provided in each of at least two membrane elements of the plurality of membrane elements, and the managing device includes data obtaining means that obtains data from the at least one sensor, comparison data storing means that previously stores comparison data that represents a correlative relationship between a position along the axial line direction in the membrane filtering device and a standard value obtained from the at least one sensor, and data comparing means that compares the data obtained by the data obtaining means with the comparison data.

According to such a configuration, at least one sensor of an electric conductivity sensor, a flow rate sensor, and a pressure sensor is provided in at least two membrane elements within a membrane filtering device. Therefore, it is possible to obtain data in which the data obtained from these sensors and the respective positions of the sensors in the axial line direction within the membrane filtering device are correlated. By comparing the data obtained in this manner with the comparison data, the cause of change occurring in the membrane filtering device can be specified more definitely, and a suitable maintenance can be carried out in accordance with the cause, so that the membrane filtering device can be managed with a higher precision.

The sensor may be provided only in the membrane element at one end and in the membrane element at the other end of the axial line direction in the membrane filtering device.

According to such a configuration, the membrane filtering device can be managed by obtaining data from the sensors that are provided only in the membrane element at one end and in the membrane element at the other end of the axial line direction in the membrane filtering device and comparing the data with the comparison data. When the sensor is provided in all of the membrane elements, the membrane filtering device can be managed further more precisely; however, in this case, the number of sensors increases, thereby raising a problem of rise in the costs. However, when the sensor is provided only in the membrane element at one end and in the membrane element at the other end of the axial line direction in the membrane filtering device as in the present invention, the cause of change occurring in the membrane filtering device can be specified in a comparatively good manner by detecting the property of liquid (permeated liquid or raw liquid) near the inlet and near the outlet of the liquid in the membrane filtering device. Therefore, the membrane filtering device can be managed with a higher precision by using the minimum needed number of sensors.

A membrane filtering device managing system according to the present invention relates to a membrane filtering device managing system comprising:

a membrane filtering device that is formed by disposing and arranging a plurality of membrane elements along an axial line direction within a tubular pressure-resistant vessel and generates a permeated liquid by filtering a raw liquid with the membrane elements; and a managing device for managing the membrane filtering device, wherein a mounting member provided with at least one sensor of an electric conductivity sensor for measuring an electric conductivity of the permeated liquid, a flow rate sensor for measuring a flow rate of the permeated liquid, and a pressure sensor for measuring a pressure of the raw liquid is mounted on each of at least two membrane elements of the plurality of membrane elements, and the managing device includes data obtaining means that obtains data from the at least one sensor, comparison data storing means that previously stores comparison data that represents a correlative relationship between a position along the axial line direction in the membrane filtering device and a standard value obtained from the at least one sensor, and data comparing means that compares the data obtained by the data obtaining means with the comparison data.

According to such a configuration, a mounting member provided with at least one sensor of an electric conductivity sensor, a flow rate sensor, and a pressure sensor is mounted on at least two membrane elements within a membrane filtering device. Therefore, it is possible to obtain data in which the data obtained from these sensors and the respective positions of the sensors in the axial line direction within the membrane filtering device are correlated. By comparing the data obtained in this manner with the comparison data, the cause of change occurring in the membrane filtering device can be specified more definitely, and a suitable maintenance can be carried out in accordance with the cause, so that the membrane filtering device can be managed with a higher precision.

For example, when the above mounting member is constructed to be capable of being mounted in an attachable/detachable manner to the membrane element, even in a case in which the membrane element is to be exchanged, the sensor provided in the mounting member can be re-used by remounting the mounting member onto a new membrane element. Moreover, since there is no need to add a change to the membrane element, a conventional membrane element can be used as it is.

The sensor may be provided only in the mounting member that is mounted on the membrane element at one end and on the membrane element at the other end of the axial line direction in the membrane filtering device.

According to such a configuration, the membrane filtering device can be managed by obtaining data from the sensors that are provided only in the mounting members respectively mounted on the membrane element at one end and on the membrane element at the other end of the axial line direction in the membrane filtering device and comparing the data with the comparison data. When the sensor is provided in all of the mounting members, the membrane filtering device can be managed further more precisely; however, in this case, the number of sensors increases, thereby raising a problem of rise in the costs. However, when the sensor is provided only in the mounting members respectively mounted on the membrane element at one end and on the membrane element at the other end of the axial line direction in the membrane filtering device as in the present invention, the cause of change occurring in the membrane filtering device can be specified in a comparatively good manner by detecting the property of liquid (permeated liquid or raw liquid) near the inlet and near the outlet of the liquid in the membrane filtering device. Therefore, the membrane filtering device can be managed with a higher precision by using the minimum needed number of sensors.

The mounting member may be an interconnector for connecting the plurality of membrane elements with each other.

According to such a configuration, at least one sensor of an electric conductivity sensor, a flow rate sensor, and a pressure sensor can be disposed in an interconnector that is inherently provided in the membrane filtering device as a mounting member for connecting the membrane elements with each other. By using the mounting member inherently provided in the membrane filtering device in this manner, there will be no need to provide a mounting member separately, whereby the production costs can be reduced.

The managing device may include instruction signal outputting means that outputs an instruction signal related to an operation of the membrane filtering device based on a result of comparison by the data comparing means.

According to such a configuration, the cause of change occurring in the membrane filtering device can be specified more definitely and an instruction signal based on the cause can be outputted, so that a suitable maintenance can be carried out and the membrane filtering device can be managed with a higher precision.

A membrane filtering device according to the present invention relates to a membrane filtering device that is used in the membrane filtering device managing system, wherein the sensor is provided only in the membrane element at one end and in the membrane element at the other end of the axial line direction.

A membrane filtering device according to the present invention relates to a membrane filtering device that is used in the membrane filtering device managing system, wherein the sensor is provided only in the mounting member that is mounted on the membrane element at one end and on the membrane element at the other end of the axial line direction.

A membrane filtering device managing method according to the present invention relates to a membrane filtering device managing method for managing a membrane filtering device that is formed by disposing and arranging a plurality of membrane elements along an axial line direction within a tubular pressure-resistant vessel and generates a permeated liquid by filtering a raw liquid with the membrane elements, comprising:

a data obtaining step that obtains data from at least one sensor of an electric conductivity sensor for measuring an electric conductivity of the permeated liquid, a flow rate sensor for measuring a flow rate of the permeated liquid, and a pressure sensor for measuring a pressure of the raw liquid, which is provided in each of at least two membrane elements of the plurality of membrane elements, and a data comparing step that compares the data obtained by the data obtaining step with comparison data that represents a correlative relationship between a position along the axial line direction in the membrane filtering device and a standard value obtained from the at least one sensor.

The data obtaining step may obtain only the data from the sensors that are provided in the membrane element at one end and in the membrane element at the other end of the axial line direction in the membrane filtering device.

A membrane filtering device managing method according to the present invention relates to a membrane filtering device managing method for managing a membrane filtering device that is formed by disposing and arranging a plurality of membrane elements along an axial line direction within a tubular pressure-resistant vessel and generates a permeated liquid by filtering a raw liquid with the membrane elements, comprising:

a data obtaining step that obtains data from at least one sensor of an electric conductivity sensor for measuring an electric conductivity of the permeated liquid, a flow rate sensor for measuring a flow rate of the permeated liquid, and a pressure sensor for measuring a pressure of the raw liquid, which is provided in a mounting member that is mounted on each of at least two membrane elements of the plurality of membrane elements, and a data comparing step that compares the data obtained by the data obtaining step with comparison data that represents a correlative relationship between a position along the axial line direction in the membrane filtering device and a standard value obtained from the at least one sensor.

The data obtaining step may obtain only the data from the sensors that are provided in the mounting members that are respectively mounted on the membrane element at one end and on the membrane element at the other end of the axial line direction in the membrane filtering device.

The membrane filtering device managing method may comprise an instruction signal outputting step that outputs an instruction signal related to an operation of the membrane filtering device based on a result of comparison by the data comparing step.

Effects of the Invention

According to the present invention, the cause of change occurring in the membrane filtering device can be specified more definitely, and a suitable maintenance can be carried out in accordance with the cause, so that the membrane filtering device can be managed with a higher precision.

MODE FOR CARRYING OUT THE INVENTION

Figure 1:
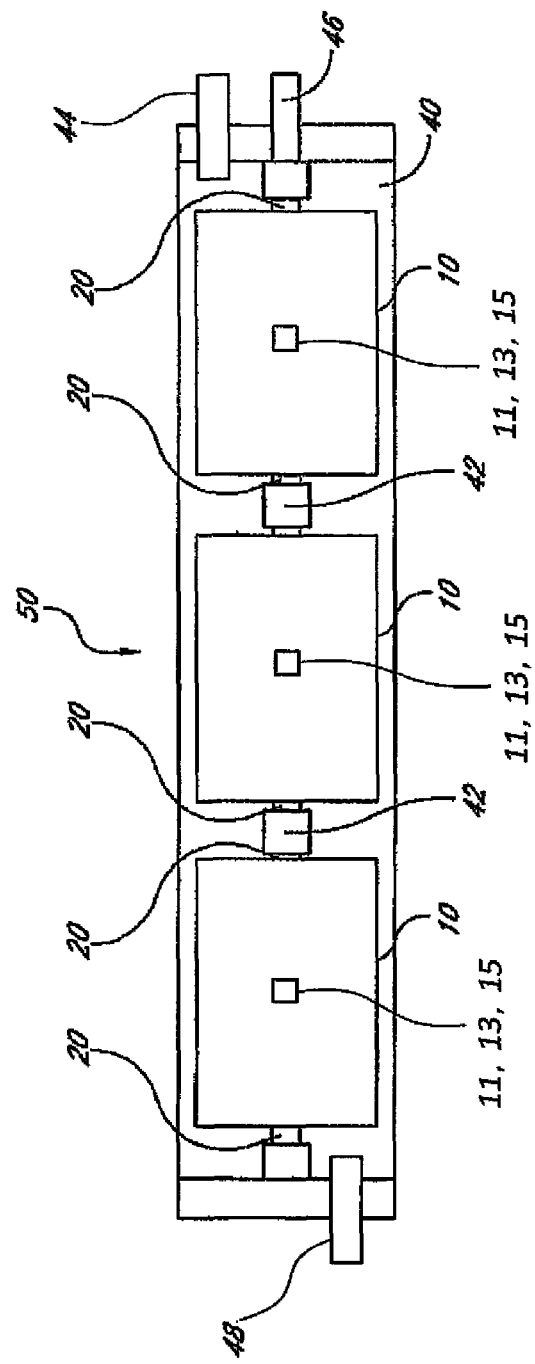
FIG. 1 is a schematic cross-sectional view illustrating one example of a membrane filtering device according to one embodiment of the present invention.
Figure 2:
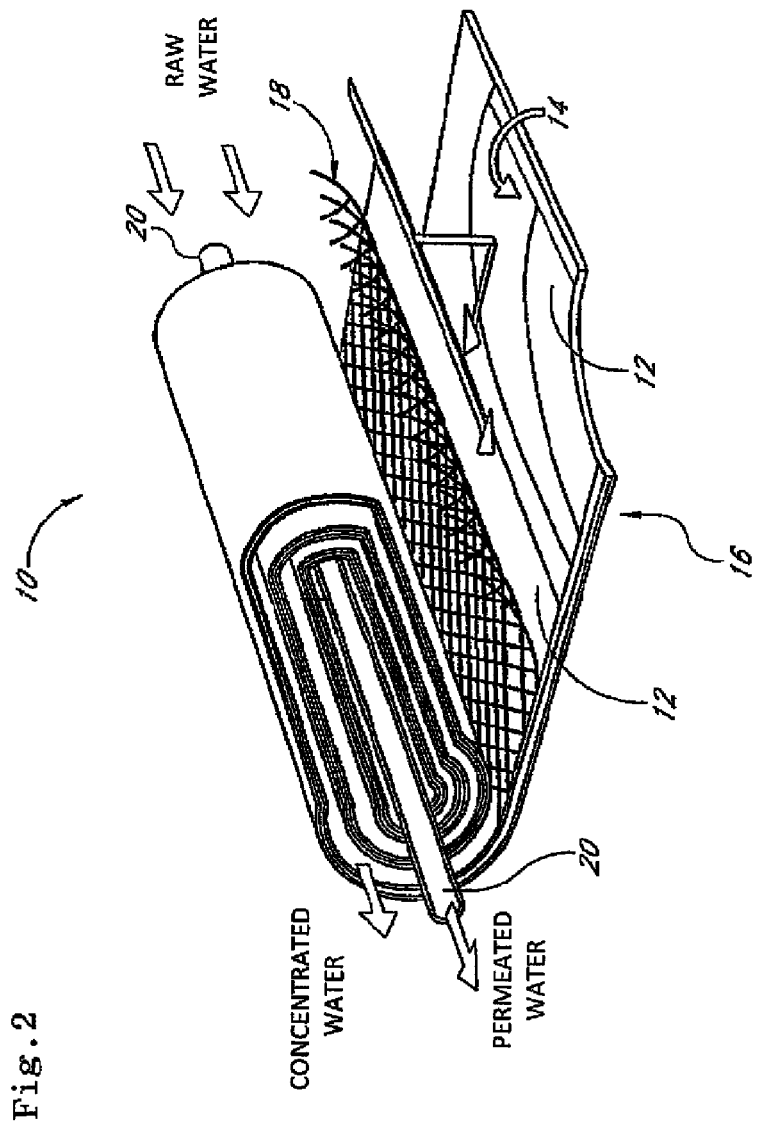
FIG. 2 is a perspective view illustrating an internal configuration of the membrane element of FIG. 1.

FIG. 1 is a schematic cross-sectional view illustrating one example of a membrane filtering device 50 according to one embodiment of the present invention. FIG. 2 is a perspective view illustrating an internal configuration of the membrane element 10 of FIG. 1. This membrane filtering device 50 is constructed by arranging a plurality of membrane elements 10 in a line within a pressure-resistant vessel 40.

The pressure-resistant vessel 40 includes a tubular body made of resin, and is formed, for example, of FRP (Fiberglass Reinforced Plastics). The plurality of membrane elements 10 are disposed and arranged along the axial line direction within this pressure-resistant vessel 40. A raw water flow inlet 48 through which a raw water (raw liquid) such as waste water or sea water flows in is formed at one end of the pressure-resistant vessel 40, and the raw water that flows in through the raw water flow inlet 48 at a predetermined pressure is filtered by a plurality of membrane elements 10, whereby a purified permeated water (permeated liquid) and a concentrated water (concentrated liquid), which is a raw water after the filtration, can be obtained. A permeated water flow outlet 46 through which the permeated water flows out and a concentrated water flow outlet 44 through which the concentrated water flows out are formed at the other end of the pressure-resistant vessel 40.

Referring to FIG. 2, the membrane element 10 is an RO (Reverse Osmosis) element that is formed in such a manner that a separation membrane 12, a feed side flow path material 18, and a permeate side flow path material 14 in a laminated state are wound in a spiral form around a core tube 20.

More specifically, onto both sides of the permeate side flow path material 14 having a rectangular shape composed of a net-shaped member made of resin, the separation membranes 12 having the same rectangular shape are superposed and the three sides thereof are bonded, whereby a bag-shaped membrane member 16 having an opening at one side is formed. Then, the opening of this membrane member 16 is mounted onto the outer circumferential surface of the core tube 20, and is wound around the core tube 20 together with the feed side flow path material 18 composed of a net-shaped member made of resin, whereby the membrane element 10 is formed. The separation membrane 12 is formed, for example, by sequentially laminating a porous supporter and a skin layer (dense layer) on a non-woven cloth layer.

When a raw water is fed through one end of the membrane element 10 formed in the above-described manner, the raw water passes within the membrane element 10 via a raw water path formed by the feed side flow path material 18 functioning as a raw water spacer. During this time, the raw water is filtered by the separation membrane 12, and the permeated water that is filtered from the raw water penetrates into a permeated water flow path formed by the permeate side flow path material 14 functioning as a permeated water spacer.

Thereafter, the permeated water that has penetrated into the permeated water flow path flows to the core tube 20 side by passing through the permeated water flow path, and is guided into the core tube 20 through a plurality of water-passing holes (not illustrated) formed on the outer circumferential surface of the core tube 20. This allows that, through the other end of the membrane element 10, the permeated water flows out via the core tube 20, and the concentrated water flows out via the raw water flow path formed by the feed side flow path material 18.

As shown in FIG. 1, regarding the plurality of membrane elements 10 that are housed within the pressure-resistant vessel 40, the core tubes 20 of adjacent membrane elements 10 are connected with each other by a tube-shaped interconnector 42. This interconnector 42 constitutes a mounting member that can be attached/detached relative to the core tube 20 of the membrane element 10. Therefore, the raw water that has flowed in through the raw water flow inlet 48 flows into the raw water flow path sequentially from the membrane element 10 on the raw water flow inlet 48 side, and the permeated water that has been filtered from the raw water by each membrane element 10 flows out through the permeated water flow outlet 46 via one core tube 20 connected by the interconnector 42. On the other hand, the concentrated water that has been concentrated by filtration of the permeated water by passing through the raw water flow path of each membrane element 10 flows out through the concentrated water flow outlet 44.

In the present embodiment, each membrane element 10 is provided with an electric conductivity sensor 11 for measuring the electric conductivity of permeated water, a flow rate sensor 13 for measuring the flow rate of permeated water, and a pressure sensor 15 for measuring the pressure of raw water. The electric conductivity sensor 11 is disposed in a core tube 20, and measures the electric conductivity of the permeated water flowing within the core tube 20. Here, in order to measure the electric conductivity of permeated water, it is preferable to provide, within the core tube 20, a temperature sensor for measuring the temperature of the permeated water. The flow rate sensor 13 is disposed in the core tube 20, and measures the flow rate of the permeated water flowing within the core tube 20. The pressure sensor 15 is disposed in a raw water flow path formed by a feed side flow path material 18, and measures the pressure of raw water flowing within the raw water flow path.

These sensors 11, 13, 15 may be provided one by one in each membrane element 10, or alternatively the number of sensors provided may differ for each membrane element 10; however, it is preferable that the same kind of sensors adjacent to each other may be arranged at an equal interval. In the example of FIG. 1, a configuration is shown in which the sensors 11, 13, 15 are provided one by one at the central part of the axial line direction in each membrane element 10. However, the present invention is not limited to such a configuration, and it is possible to adopt a configuration in which at least a part of the membrane elements 10 are provided with sensors 11, 13, 15 at one end or at both ends of the axial line direction thereof.

Here, the present invention is not limited to a configuration in which all of the above three sensors 11, 13, 15 are provided in the membrane element 10, and it is sufficient that at least one sensor of the above three sensors 11, 13, 15 is provided. Moreover, the number of membrane elements 10 and the interconnectors 42 provided in the membrane filtering device 50 is not limited to the number shown in the example of FIG. 1.

Figure 3:
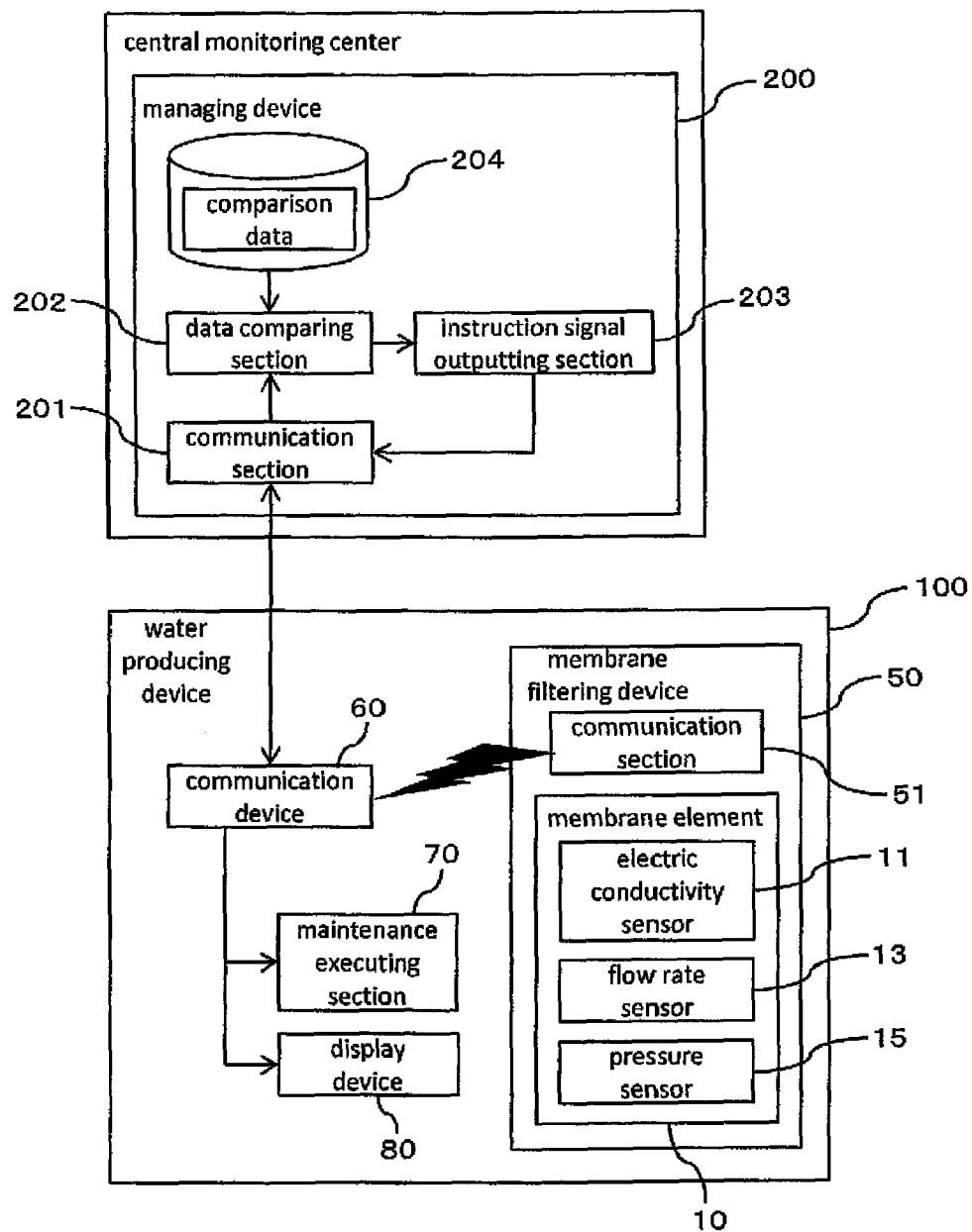
FIG. 3 is a block diagram showing one example of a membrane filtering device managing system that is applied to the membrane filtering device of FIG. 1.

FIG. 3 is a block diagram showing one example of a membrane filtering device managing system that is applied to the membrane filtering device 50 of FIG. 1. In this membrane filtering device managing system, a purified permeated water can be produced by filtering raw water such as waste water or sea water with use of a water producing device 100 equipped with numerous membrane filtering devices 50, and management of the water producing device 100 can be carried out by a managing device 200 disposed in the central monitoring center. The water producing device 100 is provided with a plurality of racks that are referred to as trains, and numerous membrane filtering devices 50 are held by each train, and management of the processing characteristics is carried out train by train.

Each membrane filtering device 50 is provided with a communication section 51 for performing communication to and from a communication device 60 that is provided in the water producing device 100 in addition to the membrane elements 10 in which the electric conductivity sensor 11, the flow rate sensor 13, and the pressure sensor 15 described above are provided. The communication section 51 and the communication device 60 are each provided with an antenna, thereby enabling wireless communication with each other. The data outputted from each of the sensors 11, 13, is wirelessly transmitted to the communication device 60 via the communication section 51 and is transmitted to the managing device 200 of the central monitoring center via the communication device 60. The communication section 51 may be mounted on the membrane element 10 or may be mounted on a different member provided in the membrane filtering device 50, such as the interconnector 42. However, the present invention is not limited to a configuration in which the data from each of the sensors 11, 13, 15 is wirelessly transmitted to the communication device 60, and it is possible to adopt a configuration in which the data are transmitted in a wired manner by connecting each of the sensors 11, 13, 15 to the communication device 60 via an electric wire.

The water producing device 100 is provided with a maintenance executing section 70 for executing maintenance on each membrane filtering device 50, a display device 80 for performing various displays related to the state or the like of the water producing device 100, and others in addition to the membrane filtering devices 50 and the communication device 60 described above. The maintenance executing section 70 is provided, for example, with a pressure valve for adjusting the pressure of the fed raw water, a flow rate adjusting valve for adjusting the flow rate of the raw water, a chemical agent cleaning unit for cleaning the inside of the membrane filtering devices 50 by introducing a chemical agent, and the like. Each section provided in the maintenance executing section 70 not only operates by direct operation of an operator but also is adapted to be capable of operating based on an instruction signal that is received from a managing device 200 of a central monitoring center via a communication device 60. The display device 80 can be constructed, for example, with a liquid crystal display or the like.

The managing device 200 of a central monitoring center is made, for example, of a computer, and is provided with a communication section 201, a data comparing section 202, an instruction signal outputting section 203, a comparison data storing section 204, and the like. The communication section 201 communicates with the communication device 60 of the water producing device 100. The communication may be either in a wired manner or in a wireless manner. The communication section 201 constitutes data obtaining means for obtaining, via the communication device 60, the data from each sensor 11, 13, 15 that is provided in the membrane filtering device 50.

The comparison data storing section 204 is comparison data storing means for storing in advance the comparison data for comparison with the obtained data from each sensor 11, 13, 15. The comparison data are made of data of correlative relationship between the position along the axial line direction in the membrane filtering device 50 and a standard value that is respectively obtained from each sensor 11, 13, 15. For example, the comparison data can be obtained by allowing the data obtained from each sensor 11, 13, 15 in a state in which the membrane filtering device 50 is normally operating (the state in which there is no need to perform maintenance) to correspond, as a standard value, to each position of the plurality of sensors 11, 13, 15 that are disposed at different positions along the axial line direction within the membrane filtering device 50.

The data comparing section 202 is data comparing means for comparing the data obtained from each sensor 11, 13, 15 provided in the membrane filtering device 50 with the comparison data stored in the comparison data storing section 204. Also, the instruction signal outputting section 203 is instruction signal outputting means for outputting an instruction signal related to operation of the membrane filtering device 50 based on a comparison result by the data comparing section 202. However, it is possible to adopt a construction in which the determination by the data comparing section 202 is carried out by the operator. In this case, it is possible to adopt a construction in which the instruction signal is outputted based on the operation of the operator. Hereinafter, the process by these data comparing section 202 and instruction signal outputting section 203 will be described more specifically.

Figure 4:
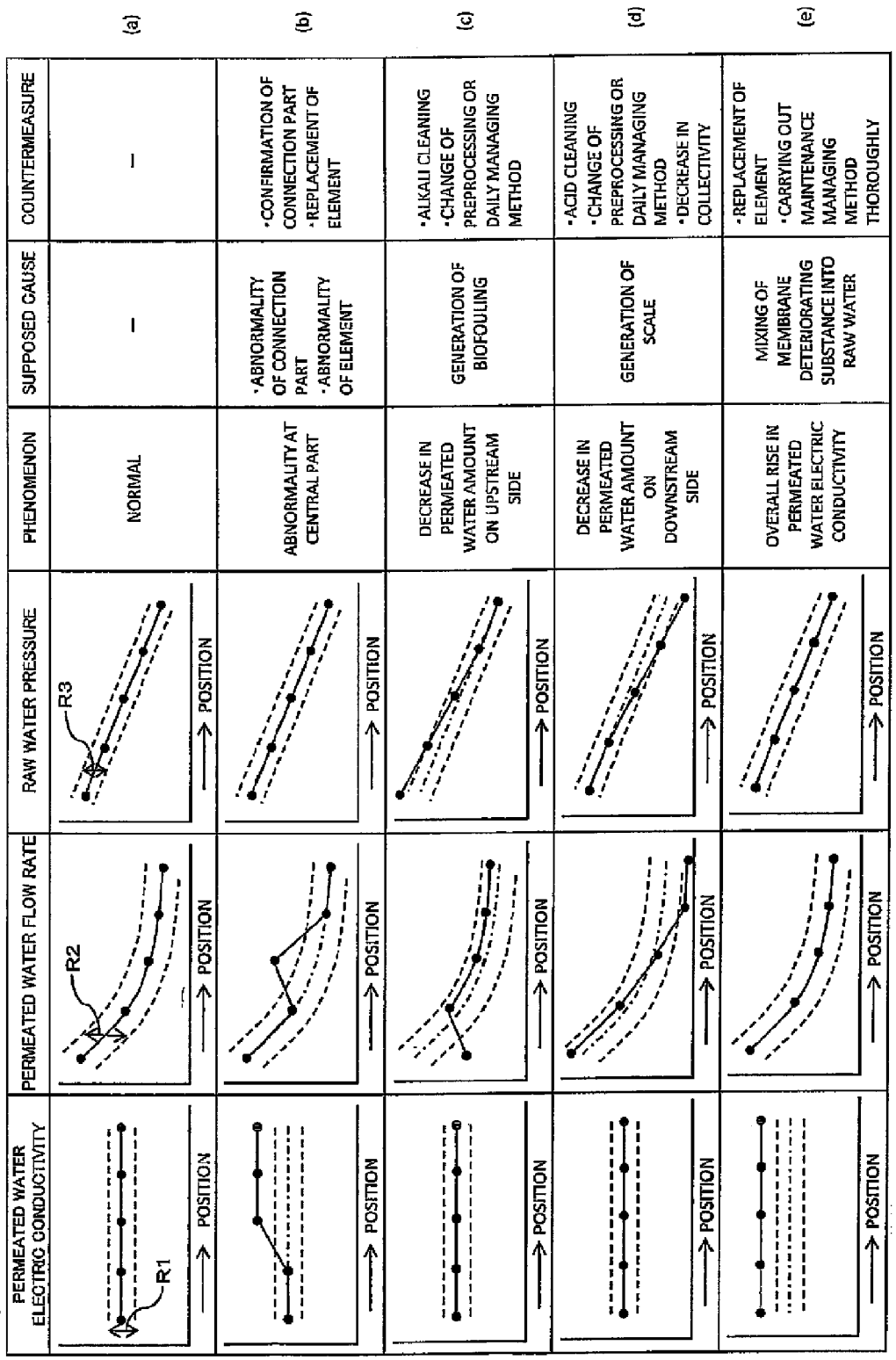
FIG. 4 is a diagram showing one example of a mode at the time of comparing the data obtained from each sensor with the comparison data.

FIG. 4 is a diagram showing one example of a mode at the time of comparing the data obtained from each of the sensors 11, 13, 15 with the comparison data. In each graph shown in this FIG. 4, a horizontal axis represents a position within the membrane filtering device 50, and the vertical axis represents a value of the data obtained from each of the sensors 11, 13, 15. Moreover, on the horizontal axis of each graph shown in FIG. 4, the left side is the upstream side of the membrane filtering device 50 (the raw water flow inlet 48 side), and the right side is the downstream side of the membrane filtering device 50 (the permeated water flow outlet 46 side). This example shows a mode of a case in which the same kind of five sets of sensors 11, 13, 15 adjacent to each other are arranged at an equal interval.

FIG. 4(a) shows one example of the comparison data, and shows a state in which the membrane filtering device 50 is normally operating. As shown in FIG. 4(a), in a state in which the membrane filtering device 50 is normally operating, the electric conductivity of the permeated water that is measured by the electric conductivity sensor 11 is almost constant irrespective of the position along the axial line direction within the membrane filtering device 50. Moreover, the flow rate of the permeated water that is measured by the flow rate sensor 13 is inversely proportional to the position along the axial line direction within the membrane filtering device 50, and decreases according as it goes from the upstream side to the downstream side in the membrane filtering device 50. In addition, the pressure of the raw water that is measured by the pressure sensor 15 is proportional to the position along the axial line direction within the membrane filtering device 50, and decreases according as it goes from the upstream side to the downstream side in the membrane filtering device 50.

The processing by the data comparing section 202 is carried out by comparison to determine whether or not the data obtained from each of the sensors 11, 13, 15 are within a predetermined range relative to the comparison data shown in FIG. 4(a). For example, the comparison is made to determine whether or not the electric conductivity of the permeated water that is measured by each of the electric conductivity sensors 11 that are disposed respectively at different positions of the axial line direction within the membrane filtering device 50 is within each predetermined electric conductivity range R1 with its center located at the comparison data of the electric conductivity corresponding to each of the positions. The comparison is made to determine whether or not the flow rate of the permeated water that is measured by each of the flow rate sensors 13 that are disposed respectively at different positions of the axial line direction within the membrane filtering device 50 is within each predetermined flow rate range R2 with its center located at the comparison data of the flow rate corresponding to each of the positions. The comparison is made to determine whether or not the pressure of the raw water that is measured by each of the pressure sensors 15 that are disposed respectively at different positions of the axial line direction within the membrane filtering device 50 is within each predetermined pressure range R3 with its center located at the comparison data of the pressure corresponding to each of the positions.

In the example of FIG. 4(*b*), among the electric conductivity sensors 11 disposed respectively at different positions, the electric conductivity of the permeated water that is measured by the electric conductivity sensor 11 located on the upstream side is within the above electric conductivity range R1; however, the electric conductivity of the permeated water that is measured by the electric conductivity sensors 11 located from the central part to the downstream side is out of the above electric conductivity range R1. In addition, among the flow rate sensors 13 disposed respectively at different positions, the flow rate of the permeated water that is measured by the flow rate sensors 13 located on the upstream side and on the downstream side is within the above flow rate range R2; however, the flow rate of the permeated water that is measured by the flow rate sensor 13 located at the central part is out of the above flow rate range R2. On the other hand, the pressure of the raw water that is measured by each of the pressure sensors 15 disposed respectively at different positions is within the above pressure range R3 at all of the positions.

In a case as described above in which, whereas the pressure of the raw water that is measured by each of the pressure sensors 15 is within the above pressure range R3, the flow rate of the permeated water that is measured by each of the flow rate sensors 13 is out of the above flow rate range R2 only at the central part in the membrane filtering device 50 and only the electric conductivity of the permeated water that is measured by the electric conductivity sensors 11 located from the central part to the downstream side is out of the above electric conductivity range R1, there is a high possibility that an abnormality has occurred in the membrane element 10 or in the interconnector 42 disposed at the central position. Therefore, in such a case, an instruction signal informing that confirmation or exchange of the membrane element 10 or the interconnector 42 should be carried out is transmitted, together with the position information of the membrane element 10 or the interconnector 42 disposed at the central part, from the communication section 201 of the managing device 200 to the communication device 60 of the water producing device 100. In the water producing device 100, the information indicating that the confirmation or exchange of the membrane element 10 or the interconnector 42 should be carried out is displayed, together with the position information, on the display device 80 based on the received instruction signal, whereby the operator performs an operation based on the display.

However, the present invention is not limited to such a configuration, and it is possible to adopt a configuration in which the confirmation or exchange of the membrane element 10 or the interconnector 42 is automatically carried out by the maintenance executing section 70 based on the received instruction signal. In addition, it is possible to adopt a configuration in which an instruction signal to prompt conveyance of a membrane element 10 for exchange to the water producing device 100 is transmitted from the central monitoring center to a member center.

In the example of FIG. 4(*c*), among the flow rate sensors 13 disposed respectively at different positions, only the flow rate of the permeated water that is measured by the flow rate sensor 13 located on the upstream side is smaller than the above flow rate range R2, and the flow rate of the permeated water that is measured by the other flow rate sensors 13 is within the above flow rate range R2. Here, the flow rate of the permeated water that is measured by the flow rate sensor 13 located on the downstream side is larger than the comparison data within the above flow rate range R2. Moreover, among the pressure sensors 15 disposed respectively at different positions, only the pressure of the raw water that is measured by the pressure sensor 15 located on the upstream side is larger than the above pressure range R3, and the pressure of the raw water that is measured by the other pressure sensors 15 is within the above pressure range R3. On the other hand, the electric conductivity of the permeated water that is measured by each of the electric conductivity sensors 11 disposed respectively at different positions is within the above electric conductivity range R1 at all of the positions.

In a case as described above in which, whereas the electric conductivity of the permeated water that is measured by each of the electric conductivity sensors 11 is within the above electric conductivity range R1, the flow rate of the permeated water that is measured by each of the flow rate sensors 13 is smaller than the above flow rate range R2 only on the upstream side in the membrane filtering device 50 and the pressure of the raw water that is measured by each of the pressure sensors 15 is larger the above pressure range R3 only on the upstream side in the membrane filtering device 50, there is a high possibility that a biofouling has been generated. This biofouling is a phenomenon in which microorganisms proliferate within the membrane filtering device 50 and, because a slimy substance is produced around the inlet of the membrane filtering device 50 by the proliferation of the microorganisms, such a tendency as described above occurs in the measured values of each of the sensors 11, 13, 15.

In such a case, an instruction signal informing that an alkali cleaning within the membrane filtering device 50 should be carried out, for example, is transmitted from the communication section 201 of the managing device 200 to the communication device 60 of the water producing device 100. In the water producing device 100, the inside of the membrane filtering device 50 is cleaned by introducing an alkaline cleaning agent from a chemical agent cleaning unit provided in the maintenance executing section 70 based on the received instruction signal.

However, the present invention is not limited to the above configuration, and it is possible to adopt a configuration in which information indicating that an alkali cleaning within the membrane filtering device 50 should be carried out, for example, is displayed on the display device 80 based on the received instruction signal, whereby the operator performs an operation based on the display. Alternatively, it is possible to adopt a configuration in which information indicating that the pre-processing or the method of daily management should be changed is displayed on the display device 80 based on the received instruction signal. Here, in the above example, whether the biofouling has occurred or not is determined based on the measured values of both of the flow rate sensor 13 and the pressure sensor 15. However, the present invention is not limited to such a configuration, and it is possible to adopt a configuration in which the determination is made based on the measured value of only one of the flow rate sensor 13 and the pressure sensor 15. Alternatively, the above determination may be made based on the measured value of only one of the flow rate sensor 13 and the pressure sensor 15 disposed on the most upstream side.

In the example of FIG. 4(*d*), among the flow rate sensors 13 disposed respectively at different positions, only the flow rate of the permeated water that is measured by the flow rate sensor 13 located on the downstream side is smaller than the above flow rate range R2, and the flow rate of the permeated water that is measured by the other flow rate sensors 13 is within the above flow rate range R2. Here, the flow rate of the permeated water that is measured by the flow rate sensor 13 located on the upstream side is larger than the comparison data within the above flow rate range R2. Moreover, among the pressure sensors 15 disposed respectively at different positions, only the pressure of the raw water that is measured by the pressure sensor 15 located on the downstream side is smaller than the above pressure range R3, and the pressure of the raw water that is measured by the other pressure sensors 15 is within the above pressure range R3. On the other hand, the electric conductivity of the permeated water that is measured by each of the electric conductivity sensors 11 disposed respectively at different positions is within the above electric conductivity range R1 at all of the positions.

In a case as described above in which, whereas the electric conductivity of the permeated water that is measured by each of the electric conductivity sensors 11 is within the above electric conductivity range R1, the flow rate of the permeated water that is measured by each of the flow rate sensors 13 is smaller than the above flow rate range R2 only on the downstream side in the membrane filtering device 50 and the pressure of the raw water that is measured by each of the pressure sensors 15 is smaller the above pressure range R3 only on the downstream side in the membrane filtering device 50, there is a high possibility that a scale has been generated. This scale is deposited when the raw liquid is concentrated as it approaches the outlet of the membrane filtering device 50 and the concentration of the salts contained in the raw liquid exceeds the solubility. Because the scale is liable to be produced near the outlet of the membrane filtering device 50, such a tendency as described above occurs in the measured values of each of the sensors 11, 13, 15.

In such a case, an instruction signal informing that an acid cleaning within the membrane filtering device 50 should be carried out, for example, is transmitted from the communication section 201 of the managing device 200 to the communication device 60 of the water producing device 100. In the water producing device 100, the inside of the membrane filtering device 50 is cleaned by introducing an acidic cleaning agent from a chemical agent cleaning unit provided in the maintenance executing section 70 based on the received instruction signal.

However, the present invention is not limited to the above configuration, and it is possible to adopt a configuration in which information indicating that an acid cleaning within the membrane filtering device 50 should be carried out, for example, is displayed on the display device 80 based on the received instruction signal, whereby the operator performs an operation based on the display. Alternatively, it is possible to adopt a configuration in which information indicating that the pre-processing or the method of daily management should be changed is displayed on the display device 80 based on the received instruction signal or a configuration in which, by automatically decreasing the set value of the collectivity (permeated water flow rate/raw water flow rate), the collectivity is optimized. Here, in the above example, whether the scale has been produced or not is determined based on the measured values of both of the flow rate sensor 13 and the pressure sensor 15. However, the present invention is not limited to such a configuration, and it is possible to adopt a configuration in which the determination is made based on the measured value of only one of the flow rate sensor 13 and the pressure sensor 15. Alternatively, the above determination may be made based on the measured value of only one of the flow rate sensor 13 and the pressure sensor 15 disposed on the most downstream side.

In the example of FIG. 4(e), the electric conductivity of the permeated water that is measured by each of the electric conductivity sensors 11 disposed respectively at different positions is larger than the above electric conductivity range R1 at all of the positions. On the other hand, the flow rate of the permeated water that is measured by each of the flow rate sensors 13 disposed respectively at different positions is within the above flow rate range R2 at all of the positions, and the pressure of the raw water that is measured by each of the pressure sensors 15 disposed respectively at different positions is within the above pressure range R3 at all of the positions.

In a case as described above in which, whereas the flow rate of the permeated water that is measured by each of the flow rate sensors 13 is within the above flow rate range R2 and the pressure of the raw water that is measured by each of the pressure sensors 15 is within the above pressure range R3, the electric conductivity of the permeated water that is measured by each of the electric conductivity sensors 11 is larger than the above electric conductivity range R1 at all of the positions, there is a high possibility that a substance that deteriorates the membrane element 10 has been mingled in the raw water. Therefore, in such a case, an instruction signal informing that exchange of the membrane element 10 should be carried out is transmitted from the communication section 201 of the managing device 200 to the communication device 60 of the water producing device 100. In the water producing device 100, exchange of the membrane element 10 is carried out automatically by the maintenance executing section 70 based on the received instruction signal.

However, the present invention is not limited to the above configuration, and it is possible to adopt a configuration in which information indicating that exchange of the membrane element 10 should be carried out is displayed on the display device 80 based on the received instruction signal, whereby the operator performs an operation based on the display. Alternatively, it is possible to adopt a configuration in which information indicating that the method of maintenance and management should be carried out thoroughly is displayed on the display device 80 based on the received instruction signal, or a configuration in which an instruction signal to prompt conveyance of a membrane element 10 for exchange to the water producing device 100 is transmitted from the central monitoring center to a member center.

Figure 5:
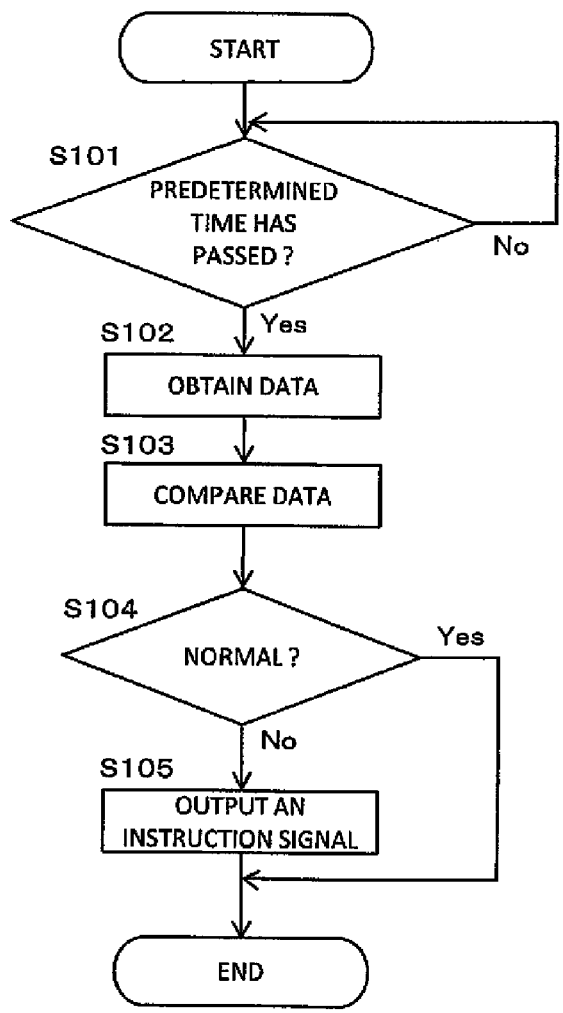
FIG. 5 is a flowchart showing one example of a process that the managing device performs.

FIG. 5 is a flowchart showing one example of the process carried out by the managing device 200. Each time a predetermined period of time passes (Yes in the step S101), the managing device 200 obtains a measured value of each of the sensors 11, 13, 15 that is provided in each membrane filtering device 50 from the water producing device 100 via the communication section 201 (step S102: data obtaining step).

The data of the obtained measured value is compared with the comparison data stored in the comparison data storing section 204 (step S103: data comparing step). When the measured values of the sensors 11, 13, 15 are all within the above predetermined ranges R1, R2, R3, it is determined as being normal (Yes in the step S104), and an instruction signal for maintenance is not outputted. On the other hand, when the measured value of any of the sensors 11, 13, 15 is out of the above predetermined range R1, R2, R3 and it is determined as not being normal (No in the step S104), an instruction signal based on the comparison result is outputted in a mode as described above using FIG. 4 (step S105: instruction signal outputting step). Here, it is possible to adopt a configuration in which at least one of the above data obtaining step, data comparing step, and instruction signal outputting step is carried out by an operator.

In the present embodiment, since the electric conductivity sensor 11, the flow rate sensor 13, and the pressure sensor 15 are provided in each of at least two of the membrane elements 10 within the membrane filtering device 50, it is possible to obtain data in which the data obtained from these sensors 11, 13, 15 and the respective positions of the sensors 11, 13, 15 in the axial line direction within the membrane filtering device 50 are correlated. By comparing the data obtained in this manner with the comparison data, the cause of change occurring in the membrane filtering device 50 can be specified more definitely, and a suitable maintenance can be carried out in accordance with the cause, so that the membrane filtering device 50 can be managed with a higher precision.

However, the present invention is not limited to a configuration in which the membrane filtering device 50 is provided with all of the electric conductivity sensor 11, the flow rate sensor 13, and the pressure sensor 15, and the membrane filtering device 50 may be provided with at least one (one kind) of the electric conductivity sensor 11, the flow rate sensor 13, and the pressure sensor 15. For example, even with a configuration in which only the electric conductivity sensor 11 is provided, it is possible to determine a state such as shown in FIGS. 4(b) and 4(e). Alternatively, even with a configuration in which only the flow rate sensor 13 is provided, it is possible to determine a state as shown in FIGS. 4(b), 4(c) and 4(d). Alternatively, even with a configuration in which only the pressure sensor 15 is provided, it is possible to determine a state such as shown in FIGS. 4(c) and 4(d). Here, it is also possible to adopt a configuration in which at least two (two kinds) of the electric conductivity sensor 11, the flow rate sensor 13, and the pressure sensor 15 are provided. For example, even with a configuration in which only the electric conductivity sensor 11 and the flow rate sensor 13 are provided, it is possible to determine a state as shown in FIGS. 4(b) and 4(e). Alternatively, even with a configuration in which only the flow rate sensor 13 and the pressure sensor 15 are provided, it is possible to determine a state as shown in FIGS. 4(c) and 4(d).

Alternatively, the number of sensors of the same kind provided in each membrane element 10 may be one or two or more; however, it is preferable that the sensors of the same kind are arranged at an equal interval along the axial line direction of the membrane filtering device 50. Alternatively, it is possible to adopt a configuration in which some of the membrane elements 10 are not provided with sensors of a certain kind.

For example, it is possible to adopt a configuration in which the sensors 11, 13, 15 are provided only in the membrane element 10 at one end (upstream side) and in the membrane element 10 at the other end (downstream side) of the axial line direction in the membrane filtering device 50. When the sensors 11, 13, 15 are provided in all of the membrane elements 10, the membrane filtering device 50 can be managed with a further higher precision; however, in this case, there is a problem in that the production costs increase because the number of sensors 11, 13, 15 increases. However, when the sensors 11, 13, 15 are provided only in the membrane element 10 at one end and in the membrane element 10 at the other end of the axial line direction in the membrane filtering device 50 as described above, the cause of change occurring in the membrane filtering device 50 can be specified in a comparatively good manner by detecting the property of the liquid (permeated water or raw water) near the inlet and near the outlet of the liquid in the membrane filtering device 50. For example, the state shown in FIGS. 4(c) and 4(d) can be determined in a good manner even with a configuration in which the sensors 11, 13, 15 are provided only in the membrane element 10 at one end and in the membrane element 10 at the other end of the axial line direction in the membrane filtering device 50. Therefore, the membrane filtering device 50 can be managed with a higher precision using the minimum needed number of sensors 11, 13, 15.

Furthermore, in the present embodiment, the cause of change occurring in the membrane filtering device 50 can be specified more definitely, and an instruction signal based on the cause can be outputted, so that a suitable maintenance can be carried out and the membrane filtering device 50 can be managed with a higher precision.

Figure 6:
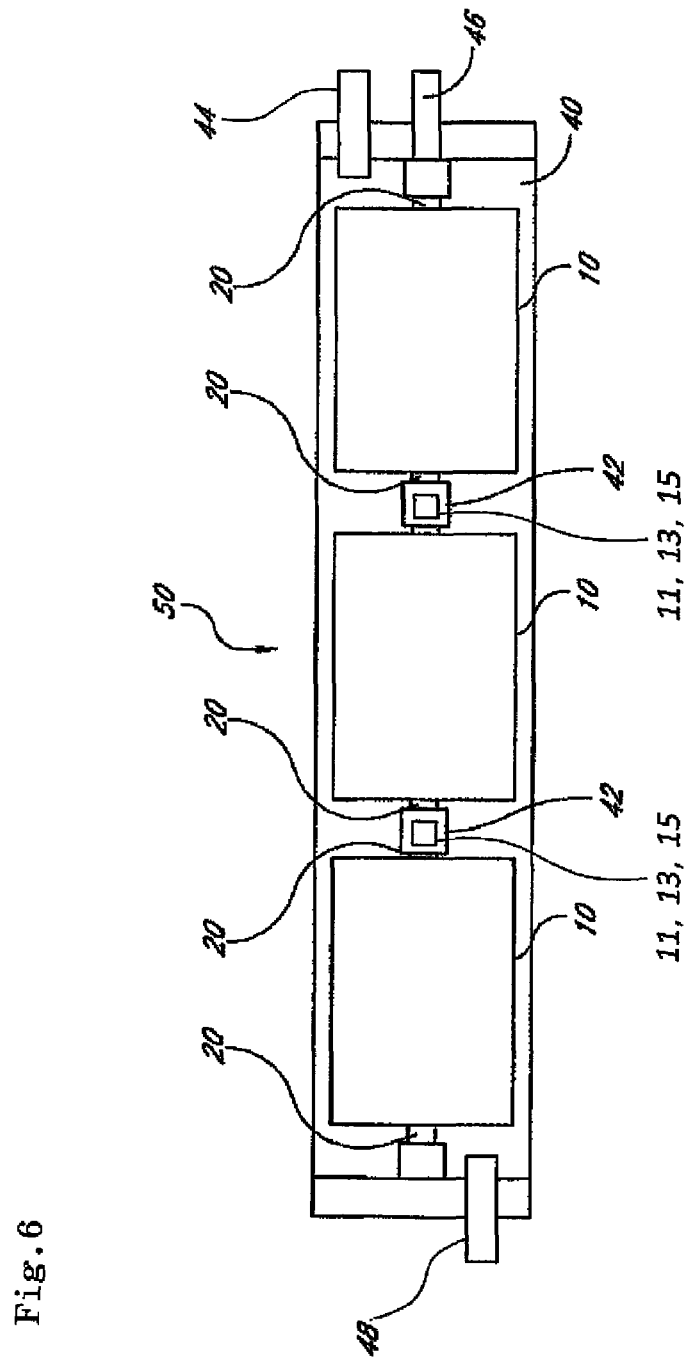
FIG. 6 is a schematic cross-sectional view illustrating one example of a membrane filtering device according to another embodiment of the present invention.

FIG. 6 is a schematic cross-sectional view illustrating one example of a membrane filtering device 50 according to another embodiment of the present invention.

The present embodiment is the same as the membrane filtering device 50 shown in FIG. 1 except that each interconnector 42 is provided with an electric conductivity sensor 11 for measuring the electric conductivity of the permeated water, a flow rate sensor 13 for measuring the flow rate of the permeated water, and a pressure sensor 15 for measuring the pressure of the raw water. The electric conductivity sensor 11 is disposed in the inside of the interconnector 42 and measures the electric conductivity of the permeated water that flows within the interconnector 42. Here, in order to measure the electric conductivity of the permeated water, it is preferable that a temperature sensor for measuring the temperature of the permeated water is provided in the interconnector 42. The flow rate sensor 13 is disposed in the inside of the interconnector 42 and measures the flow rate of the permeated water that flows within the interconnector 42. The pressure sensor 15 is disposed on the outside of the interconnector 42 and measures the pressure of the raw water that flows outside of the interconnector 42.

These sensors 11, 13, 15 may be provided one by one in each interconnector 42, or alternatively the number of sensors provided may differ for each interconnector 42; however, it is preferable that the same kind of sensors adjacent to each other may be arranged at an equal interval. Alternatively, the sensors 11, 13, 15 may be provided in another mounting member that is attachable/detachable to the membrane element 10 instead of the interconnector 42. For example, it is possible to adopt a configuration in which the sensors 11, 13, 15 are provided in the mounting member that is mounted at an end on the upstream side (the raw water flow inlet 48 side) of the membrane element 10 or in the mounting member that is mounted at an end on the downstream side (the permeated water flow outlet 46 side) of the membrane element 10.

Here, the present invention is not limited to a configuration in which all of the above three sensors 11, 13, 15 are provided in the interconnector 42, and it is sufficient that at least one sensor of the above three sensors 11, 13, 15 is provided. Also, the number of membrane elements 10 and the interconnectors 42 provided in the membrane filtering device 50 is not limited to the number shown in the example of FIG. 1.

Figure 7:
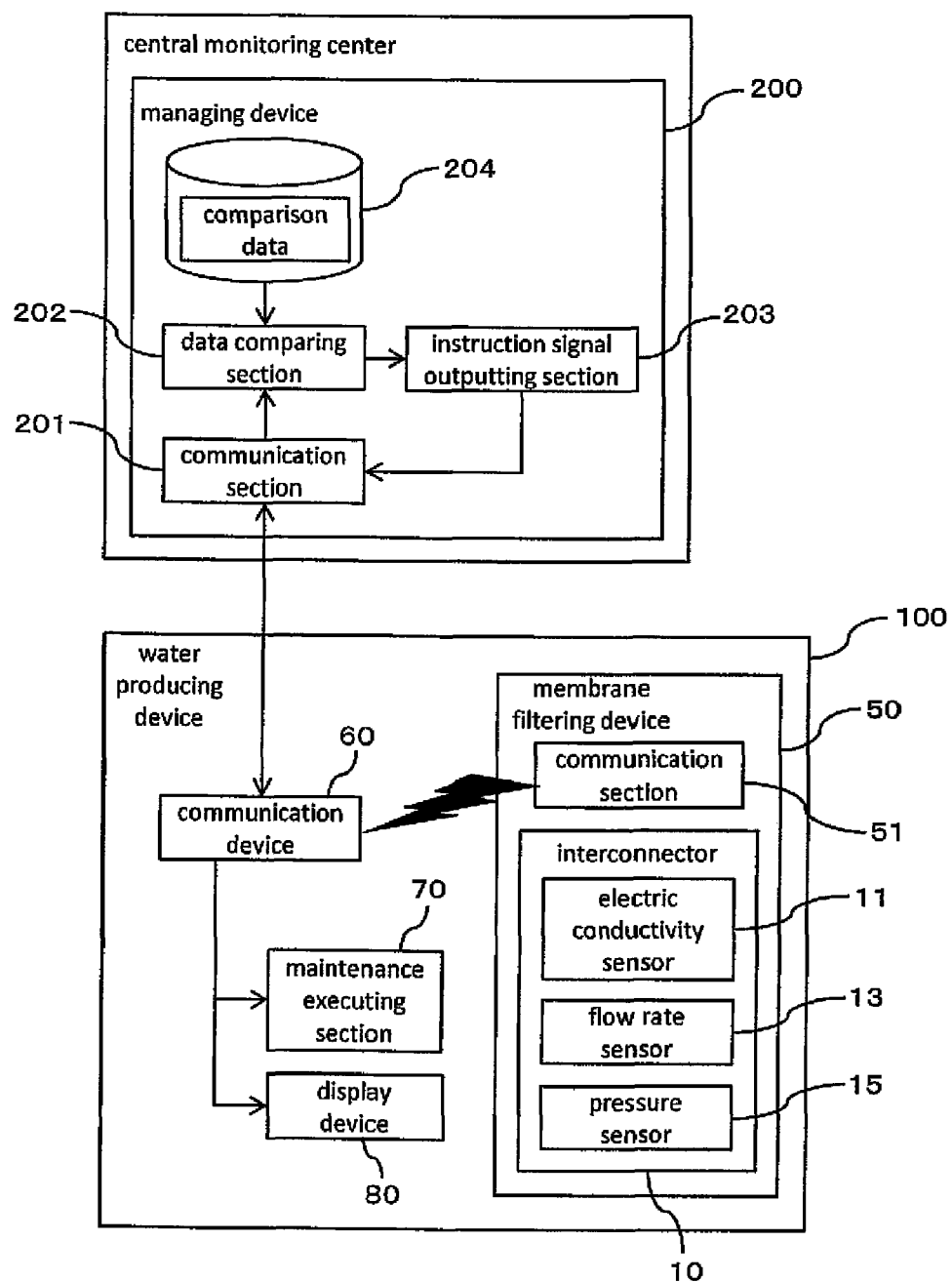
FIG. 7 is a block diagram showing one example of a membrane filtering device managing system that is applied to the membrane filtering device of FIG. 6.

FIG. 7 is a block diagram showing one example of a membrane filtering device managing system that is applied to the membrane filtering device 50 of FIG. 6. The function of each section is the same as that in the membrane filtering device 50 shown in FIG. 1 except that the electric conductivity sensor 11, the flow rate sensor 13, and the pressure sensor 15 described above are provided in the interconnector 42.

In the present embodiment, since the interconnector 42 provided with the electric conductivity sensor 11, the flow rate sensor 13, and the pressure sensor 15 is mounted on at least two of the membrane elements 10 within the membrane filtering device 50, it is possible to obtain data in which the data obtained from these sensors 11, 13, 15 and the respective positions of the sensors 11, 13, 15 in the axial line direction within the membrane filtering device 50 are correlated. By comparing the data obtained in this manner with the comparison data, the cause of change occurring in the membrane filtering device 50 can be specified more definitely, and a suitable maintenance can be carried out in accordance with the cause, so that the membrane filtering device 50 can be managed with a higher precision.

In particular, the interconnector 42 is mounted in an attachable/detachable manner to the membrane element 10. Therefore, even in a case in which the membrane element 10 is to be exchanged, the sensors 11, 13, 15 provided in the interconnector 42 can be re-used by remounting the interconnector 42 onto a new membrane element 10. Also, since there is no need to add a change to the membrane element 10, a conventional membrane element 10 can be used as it is.

However, the present invention is not limited to a configuration in which the membrane filtering device 50 is provided with all of the electric conductivity sensor 11, the flow rate sensor 13, and the pressure sensor 15, and the membrane filtering device 50 may be provided with at least one (one kind) of the electric conductivity sensor 11, the flow rate sensor 13, and the pressure sensor 15.

Alternatively, it is possible to adopt a configuration in which the same kind of sensors are provided one by one in each interconnector 42, or a configuration in which some of the interconnectors 42 are not provided with sensors of a certain kind; however, it is preferable that the sensors of the same kind are arranged at an equal interval along the axial line direction of the membrane filtering device 50.

For example, it is possible to adopt a configuration in which the sensors 11, 13, 15 are provided only in the interconnectors 42 that are mounted respectively on the membrane element 10 at one end (upstream side) and on the membrane element 10 at the other end (downstream side) of the axial line direction in the membrane filtering device 50. When the sensors 11, 13, 15 are provided in all of the interconnectors 42, the membrane filtering device 50 can be managed with a further higher precision; however, in this case, there is a problem in that the production costs increase because the number of sensors 11, 13, 15 increases. However, when the sensors 11, 13, 15 are provided only in the interconnectors 42 that are mounted respectively on the membrane element 10 at one end and on the membrane element 10 at the other end of the axial line direction in the membrane filtering device 50 as described above, the cause of change occurring in the membrane filtering device 50 can be specified in a comparatively good manner by detecting the property of the liquid (permeated water or raw water) near the inlet and near the outlet of the liquid in the membrane filtering device 50. For example, the state shown in FIGS. 4(c) and 4(d) can be determined in a good manner even with a configuration in which the sensors 11, 13, 15 are provided only in the interconnectors 42 that are mounted respectively on the membrane element 10 at one end and on the membrane element 10 at the other end of the axial line direction in the membrane filtering device 50. Therefore, the membrane filtering device 50 can be managed with a higher precision using the minimum needed number of sensors 11, 13, 15.

Furthermore, in the present embodiment, the cause of change occurring in the membrane filtering device 50 can be specified more definitely, and an instruction signal based on the cause can be outputted, so that a suitable maintenance can be carried out and the membrane filtering device 50 can be managed with a higher precision.

Further, in the present embodiment, at least two sensors of an electric conductivity sensor 11, a flow rate sensor 13, and a pressure sensor 15 can be disposed in an interconnector 42 that is inherently provided in the membrane filtering device 50 as a mounting member for connecting the membrane elements 10 with each other. By using the mounting member inherently provided in the membrane filtering device 50 in this manner, there will be no need to provide a mounting member separately, whereby the production costs can be reduced. However, it is possible to adopt a configuration in which each of the sensors 11, 13, 15 is provided in a mounting member other than the interconnector 42 that is attachable/detachable to the membrane element 10.

In the above embodiment, description has been made on a configuration in which the present invention is applied to a membrane filtering device 50 in which an RO (Reverse Osmosis) element is provided as a membrane element 10. However, the present invention can be applied not only to a membrane filtering device provided with an RO element but also to a membrane filtering device provided with another membrane element such as a UF (Ultra Filtration) element.

Alternatively, in the above embodiment, description has been made on a case in which the raw water such as waste water or sea water is filtered using the membrane filtering device 50; however the present invention is not limited to such a configuration, and it is possible to adopt a configuration in which a raw liquid other than water is filtered using the membrane filtering device 50.

Description of Symbols 10 membrane element
11 electric conductivity sensor
13 flow rate sensor
15 pressure sensor
20 core tube
40 pressure-resistant vessel
42 interconnector
50 membrane filtering device
51 communication section
60 communication device
70 maintenance executing section
80 display device
100 water producing device
200 managing device
201 communication section
202 data comparing section
203 instruction signal outputting section
204 comparison data storing section

The invention claimed is:

1. A membrane filtering device managing system comprising:
   a membrane filtering device that is formed by disposing and arranging a plurality of membrane elements along an axial line direction within a tubular pressure-resistant vessel and generates a permeated liquid by filtering a raw liquid with the membrane elements, the membrane elements being connected by at least one interconnector; and
   a managing device for managing the membrane filtering device, wherein
   in each of at least two membrane elements of the plurality of membrane elements, at least one sensor selected from the group consisting of an electric conductivity sensor for measuring an electric conductivity of the permeated liquid, a flow rate sensor for measuring a flow rate of the permeated liquid, and a pressure sensor for measuring a pressure of the raw liquid, and
   the managing device includes means for obtaining data that obtains data from the at least one sensor, means for storing comparison data that previously stores comparison data that represents a correlative relationship between a position along the axial line direction in the membrane filtering device and a standard value obtained from the at least one sensor, and means for comparing data that compares the data obtained by the means for obtaining data with the comparison data, and the means for comparing being operable for determining a deviation of sensor data with respect to a predetermined range of values corresponding to sensor position and operable to initiate an instructional signal concerning abnormality status of either a membrane element or interconnector, as applicable, based on the deviation.

2. The membrane filtering device managing system according to claim 1, wherein the sensor is provided only in the membrane element at one end and in the membrane element at the other end of the axial line direction in the membrane filtering device.

3. A membrane filtering device managing system comprising:
   a membrane filtering device that is formed by disposing and arranging a plurality of membrane elements along an axial line direction within a tubular pressure-resistant vessel and generates a permeated liquid by filtering a raw liquid with the membrane elements, the membrane elements being connected by at least one interconnector; and
   a managing device for managing the membrane filtering device, wherein
   mounted on each of at least two membrane elements of the plurality of membrane elements, at least one mounting member provided with at least one sensor selected from the group consisting of an electric conductivity sensor for measuring an electric conductivity of the permeated liquid, a flow rate sensor for measuring a flow rate of the permeated liquid, and a pressure sensor for measuring a pressure of the raw liquid, and
   the managing device includes means for obtaining data that obtains data from the at least one sensor, means for storing comparison data that previously stores comparison data that represents a correlative relationship between a position along the axial line direction in the membrane filtering device and a standard value obtained from the at least one sensor, and means for comparing data that compares the data obtained by the means for obtaining data with the comparison data, and the means for comparing being operable for determining a deviation of sensor data with respect to a predetermined range of values corresponding to sensor position and operable to initiate an instructional signal concerning abnormality status of either a membrane element or interconnector, as applicable, based on the deviation.

4. The membrane filtering device managing system according to claim 3, wherein the at least one mounting member comprises an interconnector for connecting the plurality of membrane elements with each other.

5. The membrane filtering device managing system according to claim 1, wherein the managing device includes means for outputting instruction signal that outputs an instruction signal related to an operation of the membrane filtering device based on a result of comparison by the means for comparing data.

6. A membrane filtering device that is used in the membrane filtering device managing system according to claim 1, wherein the sensor is provided only in the membrane element at one end and in the membrane element at the other end of the axial line direction.

7. The membrane filtering device managing system according to claim 1, wherein the membrane filtering device comprises a communication section and a managing device that comprises a communication device, wherein the communication section and the communication device are connected wirelessly or via wire so as to transmit data from the sensors to the managing device.

8. The membrane filtering device managing system according to claim 3, wherein the sensor is provided only in the mounting member that is mounted on the membrane element at one end and on the membrane element at the other end of the axial line direction in the membrane filtering device.

9. A membrane filtering device that is used in the membrane filtering device managing system according to claim 3, wherein the sensor is provided only in the mounting member that is mounted on the membrane element at one end and on the membrane element at the other end of the axial line direction.

10. The membrane filtering device managing system according to claim 3, wherein the managing device includes means for outputting instruction signal that outputs an instruction signal related to an operation of the membrane filtering device based on a result of comparison by the means for comparing data.

11. A membrane filtering device managing method for managing a membrane filtering device that is formed by disposing and arranging a plurality of membrane elements along an axial line direction within a tubular pressure-resistant vessel and generates a permeated liquid by filtering a raw liquid with the membrane elements, the membrane elements being connected by at least one interconnector, comprising:
   a data obtaining step that obtains data from at least one sensor selected from the group consisting of an electric conductivity sensor for measuring an electric conductivity of the permeated liquid, a flow rate sensor for measuring a flow rate of the permeated liquid, and a pressure sensor for measuring a pressure of the raw liquid, which is provided in each of at least two membrane elements of the plurality of membrane elements, and
   a data comparing step that compares the data obtained by the data obtaining step with comparison data that represents a correlative relationship between a position along the axial line direction in the membrane filtering device and a standard value obtained from the at least one sensor, and that determines a deviation of sensor data with respect to a predetermined range of values corresponding to sensor position and operable to initiate an instructional signal concerning abnormality status of either a membrane element or interconnector, as applicable, based on the deviation.

12. The membrane filtering device managing method according to claim 11, wherein the data obtaining step obtains only the data from the sensors that are provided in the membrane element at one end and in the membrane element at the other end of the axial line direction in the membrane filtering device.

13. The membrane filtering device managing method according to claim 11, comprising an instruction signal outputting step that outputs an instruction signal related to an operation of the membrane filtering device based on a result of comparison by the data comparing step.

14. A membrane filtering device managing method for managing a membrane filtering device that is formed by disposing and arranging a plurality of membrane elements along an axial line direction within a tubular pressure-resistant vessel and generates a permeated liquid by filtering a raw liquid with the membrane elements, the membrane elements being connected by at least one interconnector, comprising:

a data obtaining step that obtains data from at least one sensor selected from the group consisting of an electric conductivity sensor for measuring an electric conductivity of the permeated liquid, a flow rate sensor for measuring a flow rate of the permeated liquid, and a pressure sensor for measuring a pressure of the raw liquid, which is provided in a mounting member that is mounted on each of at least two membrane elements of the plurality of membrane elements, and a data comparing step that compares the data obtained by the data obtaining step with comparison data that represents a correlative relationship between a position along the axial line direction in the membrane filtering device and a standard value obtained from the at least one sensor, and that determines a deviation of sensor data with respect to a predetermined range of values corresponding to sensor position and operable to initiate an instructional signal concerning abnormality status of either a membrane element or interconnector, as applicable, based on the deviation.

15. The membrane filtering device managing method according to claim 14, wherein the data obtaining step obtains only the data from the sensors that are provided in the mounting members that are respectively mounted on the membrane element at one end and on the membrane element at the other end of the axial line direction in the membrane filtering device.

16. The membrane filtering device managing method according to claim 14, comprising an instruction signal outputting step that outputs an instruction signal related to an operation of the membrane filtering device based on a result of comparison by the data comparing step.

* * * * *

UNITED STATES PATENT AND TRADEMARK OFFICE
CERTIFICATE OF CORRECTION

PATENT NO.      : 8,568,596 B2                                                              Page 1 of 1
APPLICATION NO. : 12/996096
DATED           : October 29, 2013
INVENTOR(S)     : Konishi et al.

It is certified that error appears in the above-identified patent and that said Letters Patent is hereby corrected as shown below:

In the Specification

In column 1 at lines 9-13, Delete "Application No...............21(2)." and insert the same on Col. 1, Line 8 after "International" as a continuation of same Paragraph.

In column 9 at line 5, Change "is" to --15 is--.

Signed and Sealed this
Twenty-sixth Day of August, 2014

Michelle K. Lee
*Deputy Director of the United States Patent and Trademark Office*